(12) United States Patent
Yi et al.

(10) Patent No.: US 11,815,665 B2
(45) Date of Patent: Nov. 14, 2023

(54) LARGE-APERTURE INFRARED METALENS CAMERA

(71) Applicant: HUAZHONG UNIVERSITY OF SCIENCE AND TECHNOLOGY, Hubei (CN)

(72) Inventors: Fei Yi, Hubei (CN); Mingming Hou, Hubei (CN); Yan Chen, Hubei (CN); Linhan Li, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/024,982

(22) PCT Filed: Sep. 22, 2022

(86) PCT No.: PCT/CN2022/120548
§ 371 (c)(1),
(2) Date: Mar. 7, 2023

(87) PCT Pub. No.: WO2023/025327
PCT Pub. Date: Mar. 2, 2023

(65) Prior Publication Data
US 2023/0314776 A1 Oct. 5, 2023

(30) Foreign Application Priority Data
Oct. 25, 2021 (CN) .......................... 202111239416.5

(51) Int. Cl.
*H04N 23/00* (2023.01)
*G02B 13/00* (2006.01)
(Continued)

(52) U.S. Cl.
CPC ........... *G02B 13/008* (2013.01); *G02B 1/002* (2013.01); *H04N 23/20* (2023.01)

(58) Field of Classification Search
CPC ....... G02B 13/008; G02B 1/002; H04N 23/20
See application file for complete search history.

(56) References Cited

U.S. PATENT DOCUMENTS

| 2020/0225386 | A1* | 7/2020 | Tsai ........................ G02B 1/002 |
| 2021/0149081 | A1* | 5/2021 | Groever ............... G02B 5/1842 |
| 2021/0231909 | A1 | 7/2021 | Colburn et al. |

FOREIGN PATENT DOCUMENTS

| CN | 110488394 | 11/2019 |
| CN | 111380612 | 7/2020 |

(Continued)

OTHER PUBLICATIONS

Mingming Hou et al., "Lightweight Long-Wave Infrared Camera via a Single 5-Centimeter-Aperture Metalens", 2022 Conference on Lasers and Electro-Optics (CLEO), May 2022, pp. 1-2.

(Continued)

*Primary Examiner* — Kiho Kim
(74) *Attorney, Agent, or Firm* — JCIPRNET

(57) ABSTRACT

The disclosure discloses a large-aperture infrared metalens camera, which belongs to the technical field of infrared imaging and micro-nano photonics, including a large-aperture metalens, an infrared focal plane array detector, a metalens mechanical assembly and a housing. The large-aperture metalens has an aperture greater than 50 mm and a thickness less than 2 mm, and the distance between the large-aperture metalens and the infrared focal plane array detector is greater than 30 mm. The disclosure adopts strict electromagnetic field values, diffraction design algorithm and large-area semiconductor process manufacturing method to increase the aperture of metalens to 50 mm or more, and considerably improves the focal length and magnification of the camera while ensuring that the F-number of the metalens meets the requirements of signal-to-noise ratio of image. The problems of short focal length, small magni- (Continued)

fication, and insufficient imaging range of conventional metalens cameras are overcome.

10 Claims, 7 Drawing Sheets

(51) Int. Cl.
*G02B 1/00* (2006.01)
*H04N 23/20* (2023.01)

(56) References Cited

FOREIGN PATENT DOCUMENTS

| CN | 112987203 | 6/2021 |
| CN | 113013268 | 6/2021 |
| CN | 114025062 | 2/2022 |

OTHER PUBLICATIONS

"International Search Report (Form PCT/ISA/210) of PCT/CN2022/120548," dated Nov. 30, 2022, with English translation thereof, pp. 1-5.
"Written Opinion of the International Searching Authority (Form PCT/ISA/237) of PCT/CN2022/120548," dated Nov. 30, 2022, pp. 1-6.

* cited by examiner

Visible light short-focus lens has difficulty in identifying target 50m away

Experimental result of present embodiment

LARGE-APERTURE INFRARED METALENS CAMERA

CROSS-REFERENCE TO RELATED APPLICATION

This application is a 371 of international application of PCT application serial no. PCT/CN2022/120548, filed on Sep. 22, 2022, which claims the priority benefit of China application no. 202111239416.5, filed on Oct. 25, 2021. The entirety of each of the above mentioned patent applications is hereby incorporated by reference herein and made a part of this specification.

BACKGROUND

Technical Field

The disclosure belongs to the technical field of infrared imaging and micro-nano photonics, and more specifically relates to a large-aperture infrared metalens camera.

Description of Related Art

Infrared imaging technology is a technology that obtains the thermal radiation information of a target object and converts the thermal radiation information into an image visible to the human eye. Compared with visible light imaging technology, this imaging technology has the advantages of high concealment, anti-interference ability, and good adaptability to surroundings. Therefore, the technology is commonly used in military fields such as night reconnaissance, infrared guidance, and early warning of missile, as well as other civilian fields such as security monitoring, vehicle-mounted night vision, and industrial inspection.

In recent years, as infrared imaging technology is increasingly adopted in airborne, mobile and other occasions that are sensitive to equipment weight, volume and cost, light, compact and low-cost infrared cameras have become a focus of research and development. On the other hand, infrared cameras are also developed to have a larger focal length and magnification in a limited space, so as to obtain a significantly larger operating range and is expected to identify target objects at a farther range and further exploit the advantages of infrared imaging technology. In view of the above, to be lighter and to see farther are two major development trends of infrared imaging technology at present.

However, conventional lenses rely on the curved surface of components and the optical properties of materials to perform wavefront control of light, making it difficult to further reduce the weight, volume and cost of infrared cameras. As a new research direction in the field of nanophotonics, electromagnetic metasurfaces are expected to replace conventional lenses so that it is possible for infrared cameras to be "lighter". In terms of structure, an electromagnetic metasurface is a two-dimensional array of sub-wavelength or wavelength-scale electromagnetic resonance units; in terms of function, an electromagnetic metasurface is able to adjust the intensity, frequency, phase, polarization and other parameters of electromagnetic waves in the entire electromagnetic spectrum. Electromagnetic metasurface-based imaging technology (metalens) as a branch, compared with conventional optical components, has a lighter structure, lower cost, and is more adaptable for plane processing technology, so such imaging technology has broad prospects in application. If the metalens is used for infrared imaging, it helps to reduce the weight, volume and cost of the infrared camera.

Unfortunately, the current infrared camera with metalens is not able to achieve the two goals of "being lighter" and "seeing further" simultaneously for the following reasons:

(1) In the current design of infrared camera with metalens, it is almost impossible to design an infrared metalens with an aperture greater than 50 mm. At present, strict electromagnetic field numerical algorithms (such as finite time domain difference algorithm) are generally adopted to simulate the focusing spot of infrared metalens, which is used as the basis for the design of infrared metalens. However, when the aperture of the infrared metalens increases to 50 mm, millions of columnar structural units are required in the design, and such a large-scale simulation model is almost impossible to run on a general engineering design computer with an acceptable time cost.

(2) In the current manufacturing process of infrared cameras with metalens, it is a big problem to manufacture infrared metalens with an aperture larger than 50 mm. At present, electron beam exposure or ultraviolet projection lithography is commonly used in the patterning process to manufacture infrared metalenses. However, electron beam lithography is a point-by-point exposure process, which cannot complete the patterning of millions of columnar structural units with acceptable dimensional accuracy and time cost. Although ultraviolet projection lithography can guarantee a high yield, restricted by the field of view of a projection lens, the area of one exposure of UV projection lithography is limited (usually 20 mm*20 mm) and unable to cover the exposure area required by large-aperture metalens (at least 50 mm*50 mm).

(3) In combination of the above two problems, the aperture of the current infrared camera with metalens is limited. With the requirement that the F-number of metalens has to satisfy the image signal-to-noise ratio, the focal length and magnification of metalens will also be limited. As a result, the imaging range (or operating range) is also limited, which means that the current infrared camera with metalens is unable to achieve the goal of "being lighter" and "seeing further", and there is a conflict between weight and imaging range (or operating range).

SUMMARY

In view of the above defects or needs of improvement in the related art, the present disclosure provides a large-aperture infrared metalens camera, thereby solving the technical problems of small focal length, low magnification, and insufficient imaging range of the current infrared camera with metalens.

To achieve the above purpose, in an aspect of the present disclosure, a large-aperture infrared metalens camera is provided, including a large-aperture metalens, an infrared focal plane array detector, a metalens mechanical assembly and a housing.

The large-aperture metalens is arranged on the metalens mechanical assembly, and the metalens mechanical assembly is assembled on the housing. The housing is provided with a telescopic member that can move axially along the mirror surface of the large-aperture metalens.

The metalens mechanical assembly is configured to fix the large-aperture metalens.

The telescopic member is configured to move the large-aperture metalens axially along its mirror surface, so that the distance between the large-aperture metalens and the infrared focal plane array detector is greater than 30 mm.

The large-aperture metalens is configured to bend the light of thermal radiation of the target object and converge the light onto the surface of the infrared focal plane array detector, and large-aperture metalens has an aperture greater than 50 mm and a thickness less than 2 mm.

The infrared focal plane array detector is configured to eliminate stray light and light outside the wavelength band of detection, so as to realize detection and imaging.

Preferably, the large-aperture metalens includes a metasurface microstructure array, a microstructure array film coating, a substrate and a substrate film coating.

The microstructure array film coating is coated on the surface of the metasurface microstructure array to increase transmittance for an incident light, and the surface shape thereof is the same as that of the metasurface microstructure array.

The substrate film coating is coated on the surface of the substrate to increase transmittance for an incident light.

The metasurface microstructure array is located on the rear surface of the substrate, and the rear surface of the substrate is a surface where the light arrives later along the incident-light direction.

Preferably, the metasurface microstructure array includes a plurality of columnar structural units arranged according to an ordered lattice periodicity, where the heights of the columnar structural units are all the same, and fall within the order of the detected wavelength. The diameters of the columnar structural units fall within the order of subwavelength.

The periodicity of the array composed of the columnar structural units is less than 10 microns, and the diameter of the array composed of the columnar structural units is equal to the aperture of the large-aperture metalens.

Preferably, the material of the columnar structural units includes silicon or germanium; the material of the microstructure array film coating includes zinc sulfide or germanium; the material of the substrate includes intrinsic double-thrown silicon, zinc sulfide or barium fluoride; and the material of the substrate film coating includes zinc sulfide or germanium.

Preferably, the aperture and F-number of the large-aperture metalens are determined according to the following formulae:

$$C = \frac{1}{\left(\frac{L}{D \times F} - 1\right) \times P} > C_d$$

$$SNR = K \times \frac{P}{4F^2} > SNR_d$$

In the formulae, C is a pixel density of the target object in a detection image, L is a distance between the target object and the large-aperture infrared metalens camera, D is an aperture of the large-aperture metalens, F is the F-number of the large-aperture metalens, P is a pixel spacing of the infrared focal plane array detector, Cd is the required minimum pixel density of the target object in the detection image; SNR is the signal-to-noise ratio of detection of the large-aperture infrared metalens camera, K is a parameter related to the radiation degree of the target object, detection surroundings, lens transmittance, and detector responsivity, and SNRd is the required minimum signal-to-noise ratio of the large-aperture infrared metalens camera.

Preferably, the metasurface microstructure array (101) is designed by the following method: optimally designing and obtaining the surface phase distribution of the large-aperture metalens by using a diffraction design algorithm or a ray tracing algorithm according to the aperture and F-number of the large-aperture metalens; obtaining the relationship between the phase and transmittance of the columnar structural units and the size of the columnar structural units; determining the size of each of the columnar structural units at each position in the metasurface microstructure array according to the surface phase distribution of the large-aperture metalens and the relationship between the phase and transmittance of the columnar structural units and the size of the columnar structural units, and using the diffraction design algorithm or the ray tracing algorithm again for feedback optimization; the infrared transmittance of the columnar structural units is greater than the required value of the infrared transmittance.

In a preferred embodiment, the microstructure array film coating is optimally designed through an electromagnetic field simulation algorithm according to the shape of the metasurface microstructure array.

In a preferred embodiment, the substrate is optimally designed by using a finite difference time domain method and a ray tracing method.

Preferably, the metasurface microstructure array is manufactured by using semiconductor technology, including but not limited to stepping photolithography, step-scanning photolithography, nanoimprinting, laser direct writing, metal lift-off or ICP etching.

The microstructure array film coating and the substrate film coating are manufactured by an optical coating process, including but not limited to electron beam evaporation coating.

The substrate is processed through optical polishing.

Preferably, the infrared focal plane array detector includes a detector window and an infrared focal plane array, and the detector window and the infrared focal plane array are sequentially arranged along the incident-light direction.

The detector window is configured to filter out stray light and light outside the wavelength band of detection.

The infrared focal plane array is configured to detect and image the converged light.

Preferably, the metalens mechanical assembly includes a buffer structure, the buffer structure is provided with a groove matching the edge of the large-aperture metalens, and the groove is provided with a mechanical damping member configured to fix and protect the large-aperture metalens against shocks.

The material of the mechanical damping member includes but not limited to rubber, composite material or high damping alloy.

Preferably, the contact surfaces where the housing is in contact with the metalens mechanical assembly and the infrared focal plane array detector are respectively provided with sealing gaskets.

The housing is provided with a thermal insulation coating, and the material of the thermal insulation coating includes but not limited to metal oxide micro-powder or non-metallic hollow micro-spheres.

Generally speaking, compared with the related art, the above technical solutions conceived by the present disclosure are able to achieve the following advantageous effects:

1. In the large-aperture infrared metalens camera provided by the present disclosure, the aperture of the large-aperture metalens is greater than 50 mm, and the focal length is greater than 30 mm. On the premise of keeping the large-aperture metalens light, the magnification and imaging range are considerably improved, so the problems of short focal length and low magnification of conventional metalens cameras are overcome, and it is possible to detect and image objects at medium and long ranges. The disclosure further obtains the method of determining the aperture and F-number of the large-aperture metalens according to the system parameters, thereby better taking into account the goals of "being lighter" and "seeing farther", and solving the conflict between weight and imaging range (or operating range).

2. The technology for designing the large-aperture infrared metalens camera provided by the present disclosure does not need to complicatedly calculate the strict electromagnetic field of the entire large-aperture metalens. Instead, the technology divides the design of the large-aperture metalens into surface phase distribution design and local phase design (i.e., phase design of columnar structural units), and it is only necessary to calculate the strict electromagnetic field of the columnar structural units and the diffraction field or light field of the surface phase distribution, which considerably reduces the calculation steps and improves the design efficiency. In terms of the simulation feedback optimization, the diffraction algorithm or the ray tracing algorithm is also introduced to replace the strict electromagnetic field algorithm, which further improves the calculation accuracy and improves the optimization efficiency.

3. The large-aperture infrared metalens camera provided by the present disclosure adopts high-yield large-area patterning processes such as stepping lithography, step-by-step scanning lithography, nanoimprinting or laser direct writing to replace small-area pattering processes such as electron beam exposure and ultraviolet projection lithography process, thereby expanding the coverage area of the patterning process, increasing the speed of patterning, so that the large-aperture metalens may be fabricated in large quantities.

4. In the large-aperture infrared metalens camera provided by the present disclosure, the large-aperture metalens is coated with an anti-reflection film on both sides, which improves the transmittance of the metalens. The mechanical assembly of the metalens adopts a buffer structure, which is able to fix, adjust and protect the metalens against shocks, thus solving the problem of poor mechanical performance of conventional metalens cameras.

5. The housing of the large-aperture infrared metalens camera provided by the present disclosure adopts a thermal insulation coating and sealing treatment, thereby protecting the lens from heat and water, so that the lens has better athermalization and waterproof performance.

Figure 1:
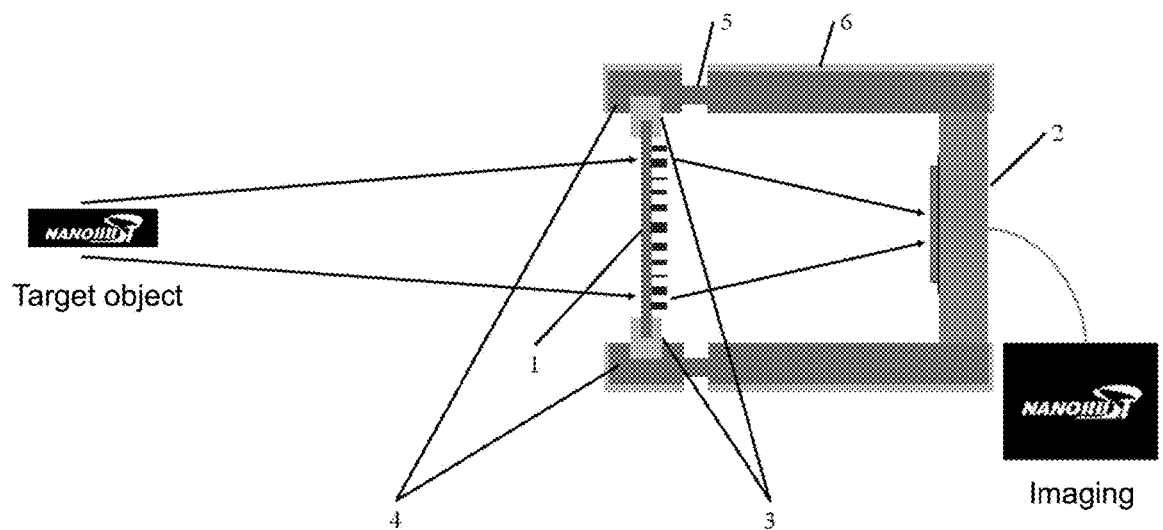
FIG. 1 is a schematic structural view of a large-aperture infrared metalens camera provided by an embodiment of the present disclosure.

In all the drawings, the same reference numerals are used to represent the same members or structures, in which: 1—large-aperture metalens; 101—metasurface microstructure array; 1011—columnar structural unit; 102—microstructure array film coating layer; 103—substrate; 104—substrate film coating; 2—infrared focal plane array detector; 3—metalens mechanical assembly; 301—buffer structure; 3011—mechanical damping member; 3012—groove; 4—housing; 401—sealing gasket; 5—telescopic member; 6—thermal insulation coating.

DESCRIPTION OF THE EMBODIMENTS

In order to make the purpose, technical solution and advantages of the present disclosure more comprehensible, the present disclosure will be further described in detail below in conjunction with the accompanying drawings and embodiments. It should be understood that the specific embodiments described here are only used to explain the present disclosure, not to limit the present disclosure. In addition, the technical features involved in the various embodiments of the present disclosure described below can be combined with each other as long as they do not constitute a conflict with each other.

As shown in FIG. 1 to FIG. 14, the present disclosure provides a large-aperture infrared metalens camera, including a large-aperture metalens 1 and an infrared focal plane array detector 2 arranged in sequence along the incident-light direction, as well as a metalens mechanical assembly 3 and a housing 4.

The large-aperture metalens 1 is configured to bend the light of the thermal radiation of the target object, and has a diameter greater than 50 mm and a thickness less than 2 mm. By using the large-aperture metalens 1 with a small thickness for imaging, on the premise of keeping the large-aperture metalens 1 light, the magnification and imaging range are considerably improved, so the problems of short focal length and low magnification of conventional metalens cameras are overcome, and it is possible to detect and image objects at medium and long ranges. Preferably, the aperture and F-number of the large-aperture metalens 1 are determined according to the following formulae:

$$C = \frac{1}{\left(\frac{L}{D \times F} - 1\right) \times P} > C_d$$

$$SNR = K \times \frac{P}{4F^2} > SNR_d$$

In the formulae, C is a pixel density of the target object in a detection image, L is a distance between the target object and the large-aperture infrared metalens camera, D is an aperture of the large-aperture metalens, F is the F-number of the large-aperture metalens, P is a pixel spacing of the infrared focal plane array detector, Cd is the required minimum pixel density of the target object in the detection image; SNR is the signal-to-noise ratio of detection of the large-aperture infrared metalens camera, K is a parameter related to the radiation degree of the target object, detection surroundings, lens transmittance, and detector responsivity, and SNRd is the required minimum signal-to-noise ratio of the large-aperture infrared metalens camera. The above determination criteria take into account both the weight parameter of the camera (the aperture and F-number of the large-aperture metalens) and the imaging range parameter (the distance between the target object and the large-aperture infrared metalens camera), so as to better take into account the goals of "being lighter" and "seeing further", thus solving the conflict between weight and imaging range (or operating range).

In an embodiment of the present disclosure, the large-aperture metalens 1 includes a metasurface microstructure array 101, a microstructure array film coating 102 covering the metasurface microstructure array 101, a substrate 103, and a substrate film coating 104 covering the substrate 103. The metasurface microstructure array 101 is located on the rear surface of the above-mentioned substrate 103, and the rear surface of the above-mentioned substrate 103 is a surface where the light arrives later along the incident-light direction. The metasurface microstructure array 101 is composed of a series of columnar structural units 101 arranged according to an ordered lattice periodicity, where the heights of the columnar structural units 1011 are all the same, and fall within the order of the detected wavelength. The diameters of the columnar structural units 1011 fall within the order of subwavelength. The periodicity of the array composed of the columnar structural units 1011 is less than 10 microns, and the diameter of the array composed of the columnar structural units 1011 is equivalent to the aperture of the large-aperture metalens 1. The material of the columnar structural units 1011 is an infrared high-refractive-index material, including but not limited to silicon, germanium, etc. The microstructure array film coating 102 covering the metasurface microstructure array is configured to increase transmittance for an incident light, and a surface shape thereof changes with the shape of the metasurface microstructure array 101, including but not limited to zinc sulfide, germanium coating. The substrate 103 is made of a material highly transparent to infrared light, including but not limited to intrinsic double-polished silicon, zinc sulfide, barium fluoride, etc. The substrate film coating 104 covering the substrate is provided to increase transmittance for an incident light, including but not limited to zinc sulfide, germanium coating.

In an embodiment of the present disclosure, the large-aperture metalens 1 is coated with an anti-reflection coating on both sides, which increases the transmittance of the camera.

To further illustrate, the metasurface microstructure array 101 is designed as follows: optimally designing and obtaining the surface phase distribution of the large-aperture metalens 1 by using a diffraction design algorithm or a ray tracing algorithm according to the aperture and F-number of the large-aperture metalens 1; obtaining the relationship between the phase and transmittance of the columnar structural units 1011 and the size of the columnar structural units 1011 according to the strict electromagnetic field numerical algorithm; determining the size of each of the columnar structural units 1011 at each position in the metasurface microstructure array 101 according to the surface phase distribution of the large-aperture metalens 1 and the relationship between the phase and transmittance of the columnar structural units 1011 and the size of the columnar structural units 1011, and using the diffraction design algorithm or the ray tracing algorithm again for feedback optimization; the infrared transmittance of the columnar structural units 1011 is greater than the required value of the infrared transmittance; the microstructure array film coating 102 covering the metasurface microstructure array is optimally designed according to the shape of the metasurface microstructure array 101 through an electromagnetic field simulation algorithm; the substrate 103 is optimally designed by using the finite difference time domain method and ray tracing method. The above design method does not need to complicatedly calculate the strict electromagnetic field of the entire large-aperture metalens. Instead, the design divides the large-aperture metalens into surface phase distribution design and local phase design (i.e., phase design of columnar structural units), and it is only necessary to calculate the strict electromagnetic field of the columnar structural units and the diffraction field or light field of the surface phase distribution, which considerably reduces the calculation steps and improves the design efficiency. In terms of the simulation feedback optimization, the diffraction algorithm or the ray tracing algorithm is also introduced to replace the strict electromagnetic field algorithm, which further improves the calculation accuracy and improves the optimization efficiency.

In an embodiment of the present disclosure, the metasurface microstructure array 101 is fabricated by a large-area semiconductor process, including but not limited to stepping photolithography, step-by-step scanning photolithography, nanoimprinting, laser direct writing, metal lift-off, ICP etching, etc. The microstructure array film coating 102 covering the metasurface microstructure array and the substrate film coating 104 covering the substrate 103 are fabricated by an optical coating process, including but not limited to electron beam evaporation coating. The substrate 103 is optically polished. In the above fabrication process, high-yield large-area patterning processes such as stepping lithography, step-by-step scanning lithography, nanoimprinting or laser direct writing are adopted to replace small-area patterning processes such as electron beam exposure and ultraviolet projection lithography processes, thereby expanding the coverage area of the patterning process, increasing the speed of patterning, so that large-aperture metalens may be fabricated in large quantities.

To further illustrate, the infrared focal plane array detector 2 is configured to eliminate stray light and light outside the wavelength band of detection, so as to realize detection and imaging. In an embodiment of the present disclosure, the infrared focal plane array detector 1 includes a detector window and an infrared focal plane array arranged in sequence along the incident-light direction. The detector window is configured to filter out stray light and light outside the wavelength band of detection. The infrared focal plane array is configured to detect and image the converged light.

In an embodiment of the present disclosure, the metalens mechanical assembly 3 is configured to fix, adjust and protect the large-aperture metalens 1 against shocks. Specifically, the metalens mechanical assembly 3 is provided with a buffer structure 301, and the buffer structure 301 adopts a mechanical damping member 3011. The material of the mechanical damping member 3011 includes but is not limited to rubber, composite material, high damping alloy, etc. The buffer structure 301 has a groove 3012 matching the edge of the large-aperture metalens 1, and the groove 3012 is able to clamp the large-aperture metalens 1 to fix and protect the large-aperture metalens 1 against shocks. The metalens mechanical assembly 3 is fixedly connected with the metalens mechanical assembly 3 and the housing 4. The housing 4 may be stretched through the telescopic member 5, so that the metalens mechanical assembly 3 cooperates with the housing 4 to adjust the large-aperture metalens 1. The metalens mechanical assembly 3 is provided with a buffer structure 301, which may fix, adjust and protect the large-aperture metalens 1 against shocks, thus solving the problem of poor mechanical performance of conventional metalens cameras.

In an embodiment of the present disclosure, the housing 4 serves to provide thermal insulation and waterproof protection for the lens. Preferably, the housing 4 is sealed with a thermal insulation coating 6. The material of the thermal insulation coating 6 includes, but is not limited to, metal oxide micro-powder, non-metallic hollow micro-spheres, etc., and the sealing process includes, but is not limited to, the use of sealing gaskets 401 at the joints of the housing 4. The housing 4 enables the lens to have better athermalization and waterproof performance.

In the present disclosure, the distance between the large-aperture metalens 1 and the infrared focal plane array detector 2 is greater than 30 mm. When there is no other optical elements added between the large-aperture metalens 1 and the infrared focal plane array detector 2, the distance provides a necessary space for the focal length of the camera, which is essential for increasing the magnification of the camera.

The disclosure provides a large-aperture infrared metalens camera, which improves the design efficiency of large-aperture metalens in terms of design technology. In terms of fabrication technology, it is possible for large-aperture metalens to be fabricated in large quantities, and therefore the aperture of the large-aperture metalens may be greater than 50 mm, and the focal length may be greater than 30 mm. On the premise of keeping the large-aperture metalens light, the magnification and imaging range are considerably improved, thereby solving the technical problems of small focal length, low magnification and insufficient imaging range of current infrared cameras with metalens. In the meantime, the disclosure retains the advantages of metalens being light and thin (thickness less than 2 mm) and being able to be mass-produced, thus allowing the camera to be light, compact and low in cost, significantly reducing the weight, volume and cost of the medium and long-range infrared camera. The disclosure may be applied to medium and long-range detection and imaging, border security, medium and long-range thermal induction, smart home, intelligent environment perception and other occasions.

The technical solutions of the present disclosure will be further described below through specific examples.

FIG. 1 illustrates a large-aperture infrared metalens camera provided by the present disclosure, including: a large-aperture metalens 1, an infrared focal plane array detector 2, a metalens mechanical assembly 3, a housing 4, a telescopic member 5, and a thermal insulation coating 6.

The large-aperture metalens 1 is configured to bend the light of the thermal radiation of the target object, and has a thickness of 0.5 mm. The aperture and F-number of the large-aperture metalens 1 are further selected according to the following formulae:

$$C = \frac{1}{\left(\frac{L}{D \times F} - 1\right) \times P} > C_d$$

$$SNR = K \times \frac{P}{4F^2} > SNR_d$$

In the formulae, C is a pixel density of the target object in a detection image, L is a distance between the target object and the large-aperture infrared metalens camera, D is an aperture of the large-aperture metalens, F is the F-number of the large-aperture metalens, P is a pixel spacing of the infrared focal plane array detector, Cd is the required minimum pixel density of the target object in the detection image; SNR is the signal-to-noise ratio of detection of the large-aperture infrared metalens camera, K is a parameter related to the radiation degree of the target object, detection surroundings, lens transmittance, and detector responsivity, and SNRd is the required minimum signal-to-noise ratio of the large-aperture infrared metalens camera.

In this embodiment, P=17 μm. According to the empirical formula of K and the empirical value that is substituted, under the appropriate $SNR_d$, F=1 is selected. According to the Johnson criterion of infrared images, it requires no less than 12 pixels to be imaged in the critical direction to identify the target. Assuming that this embodiment is used for medium and large indoor intelligent sensing (such as gymnasiums), it is necessary to detect the whole body thermal image of a person to identify the human body and analyze the moving position and route thereof to provide information for controlling indoor equipment (such as air conditioners, lights, curtains, projectors, etc.) in the next step. The target object is a person, and the feature size exceeds 1 m. Considering that the camera also has certain aberrations and noise, $C_d$=12*4=48 m$^{-1}$ is selected. When the imaging range L=50 m, F=1, P=17 μm, take D=50.2 mm, then C=59 m$^{-1}$>$C_d$. That is, the aperture of the large-aperture metalens is 50.2 mm, and the F-number is 1, which can meet the requirements of the signal-to-noise ratio and the imaging range (not less than 50 meters) of this embodiment simultaneously. The above determination criteria ensure that the appropriate parameters are selected under the required target parameters, while taking into account the weight parameters of the camera (the aperture and F-number of the large-aperture metalens) and the imaging range parameters (the distance between the target object and the above large-aperture infrared metalens camera). In this way, it is possible to better take into account the goals of "being lighter" and "seeing farther", and solve the conflict between weight and imaging range (or operating range).

Figure 2:
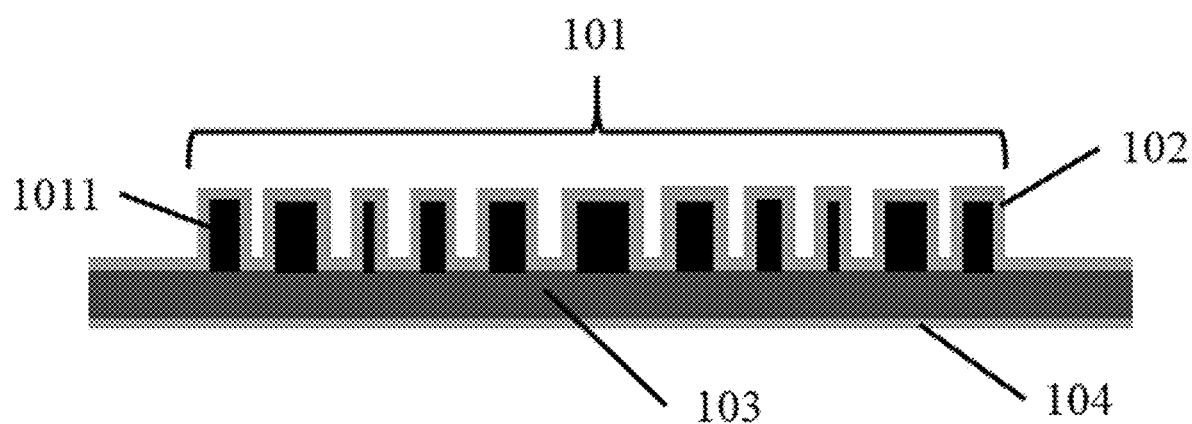
FIG. 2 is a schematic structural view of a large-aperture metalens provided by an embodiment of the present disclosure.
Figure 3:
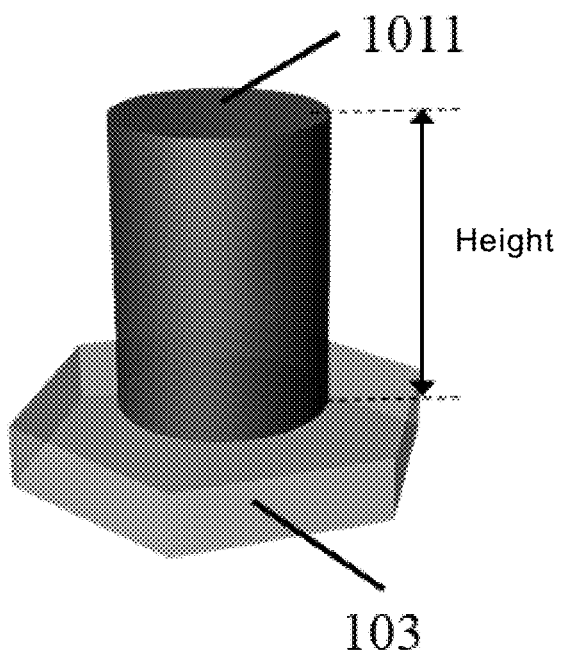
FIG. 3 is a schematic view of a columnar structural unit and a substrate in the form of a hexagonal lattice provided by an embodiment of the present disclosure.
Figure 4:
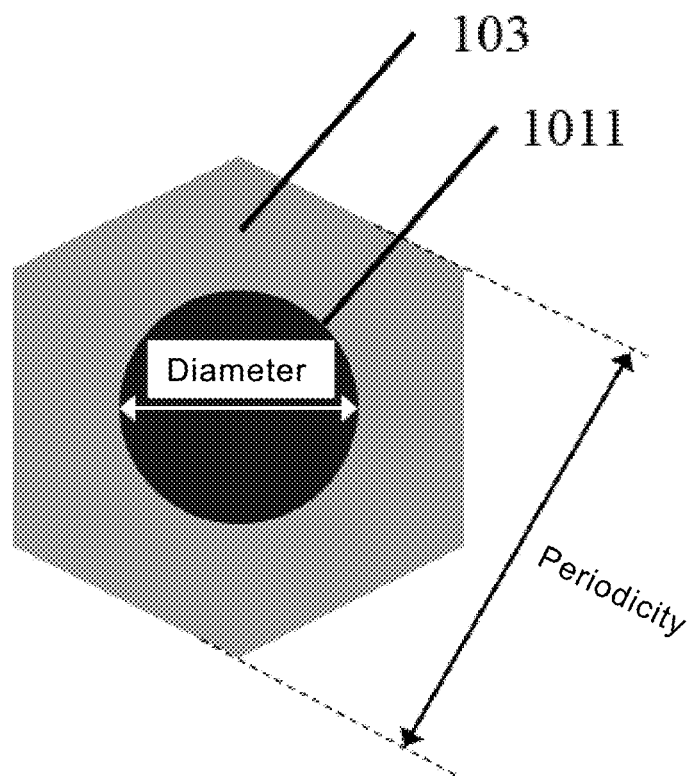
FIG. 4 is a top view of a columnar structural unit and a substrate in the form of a hexagonal lattice provided by an embodiment of the present disclosure.

In further explanation, the specific structure of the large-aperture metalens in the present embodiment is as shown in FIG. 2, including the metasurface microstructure array 101, the microstructure array film coating 102 covering the metasurface microstructure array 101, the substrate 103 and the substrate film coating 104 covering the substrate 103. The metasurface microstructure array 101 is located on the rear surface of the substrate 103, and the rear surface of the substrate 103 is a surface where the light arrives later along the incident-light direction. In this embodiment, in order to obtain a larger unit-to-phase sampling density, the metasurface microstructure array 101 is formed by a series of columnar structural units 1011 arranged in a hexagonal lattice periodicity. FIG. 3 and FIG. 4 further respectively show the schematic view and top view of the columnar structural units 1011 and a substrate 103 in the form of hexagonal lattice. It should be noted that, in order to better illustrate the structure of the columnar structural units, the drawings omit the microstructure array film coating 102 covering the metasurface microstructure array 101 and the substrate film coating 104 covering the substrate 103. The heights of the columnar structural units 1011 are all the same and fall within the order of the detected wavelength, and the diameters of the columnar structural units 1011 fall within the order of subwavelength. The periodicity of the array formed by the columnar structural units 1011 is less than 10 microns, and the diameter of the array composed of the columnar structural units 1011 is equal to the aperture D of the large-aperture metalens 1. In this embodiment, the operation wavelength band is long-wave infrared, so the material of the columnar structural units 1011 is intrinsic silicon. The microstructure array film coating 102 covering the metasurface microstructure array 101 is configured to increase transmittance for an incident light, and the surface shape thereof is changed along with the shape of the metasurface microstructure array 101, using alternating coatings of zinc sulfide and germanium. The substrate 103 adopts an intrinsic double-polished silicon wafer. The substrate film coating 104 covering the substrate 103 is used to increase transmittance for an incident light, and adopts alternate coatings of zinc sulfide and germanium. The large-aperture metalens 1 is coated with anti-reflection coating on both sides, which may theoretically increase the transmittance of the camera to 80% or more.

Figure 5:
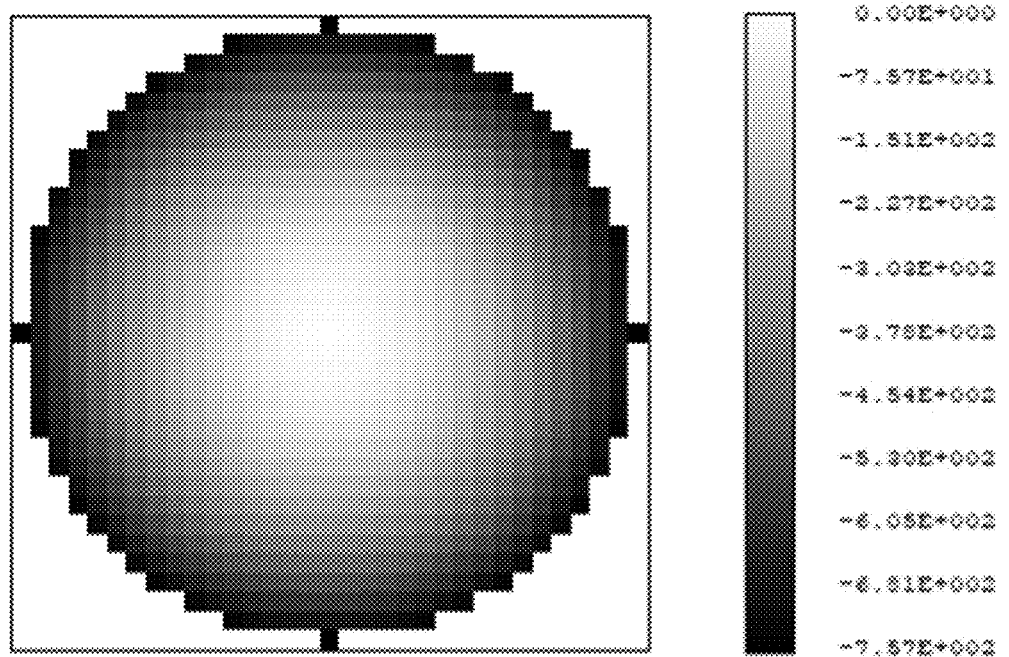
FIG. 5 is a surface phase distribution of a large-aperture metalens provided by an embodiment of the present disclosure.
Figure 6:
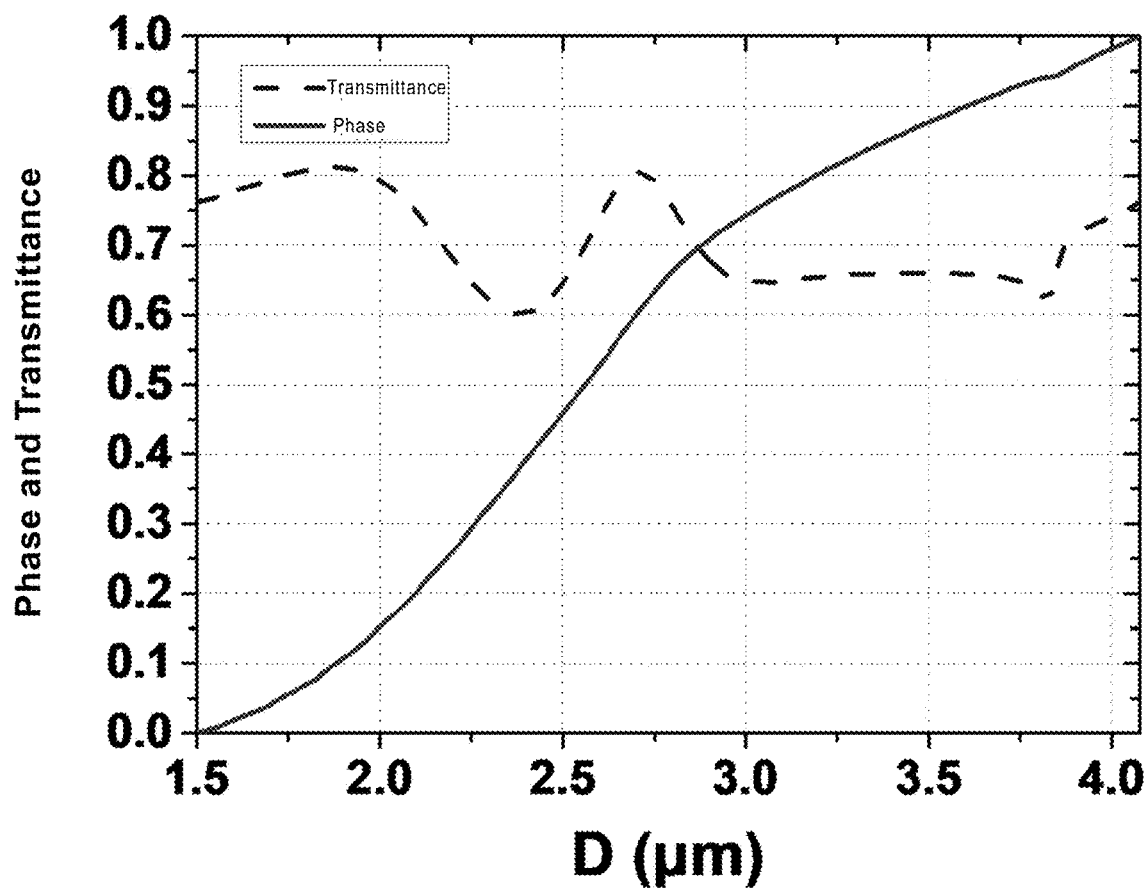
FIG. 6 shows the phase and transmittance obtained under different diameters of the columnar structural units provided by an embodiment of the present disclosure.
Figure 7:
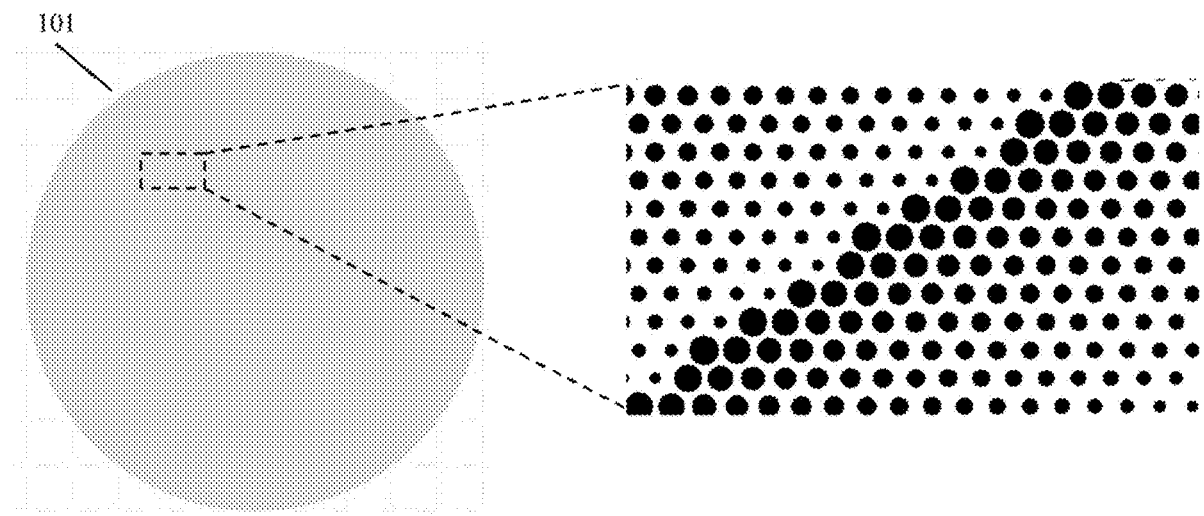
FIG. 7 is a top view of a large-area metasurface microstructure array in the large-aperture metalens designed and provided by an embodiment of the present disclosure.

The metasurface microstructure array 101 described in this embodiment is designed according to the following method: optimally designing and obtaining the surface phase distribution of the large-aperture metalens 1 by using a ray tracing algorithm according to the aperture D=50.2 mm and F-number=1 of the large-aperture metalens 1; obtaining the relationship between the phase and transmittance of the columnar structural units 1011 and the size of the columnar structural units 1011 (which is the diameter of the cylinder in this example) according to a time domain finite difference algorithm (a commonly used strict electromagnetic field numerical algorithm); determining the size of each of the columnar structural units 1011 at each position in the large-surface metasurface microstructure array 101 according to the surface phase distribution of the large-aperture metalens 1 and the relationship between the phase and transmittance of the columnar structural units 1011 and the diameter of the columnar structural units 1011, and using the diffraction design algorithm again for feedback optimization. Specifically, the phase and transmittance of the columnar structural units 1011 are substituted into the diffraction design algorithm, so that the simulation may reflect the optical performance of the metasurface microstructure array 101. The infrared transmittance of the columnar structural units 1011 is greater than the required value of the infrared transmittance. The microstructure array film coating 102 covering the metasurface microstructure array 101 is optimally designed according to the shape of the metasurface microstructure array 101 through a finite time domain difference algorithm; the thickness of the substrate 103 is optimally designed by using a ray tracing method. According to the above method, FIG. 5 shows the surface phase distribution of the large-aperture metalens 1 obtained in the final design. The height of the columnar structural units 1011 is selected as 6 μm, and the periodicity is 4 μm. FIG. 6 shows the relationship between the phase and transmittance of the columnar structural units 1011 and the diameter of the columnar structural units 1011. FIG. 7 is a top view of the metasurface microstructure array 101 in the designed large-aperture metalens 1. All simulation designs are completed on a common computer, which verifies the high simulation design efficiency of the present disclosure for large-aperture metalens 1.

Figure 8:
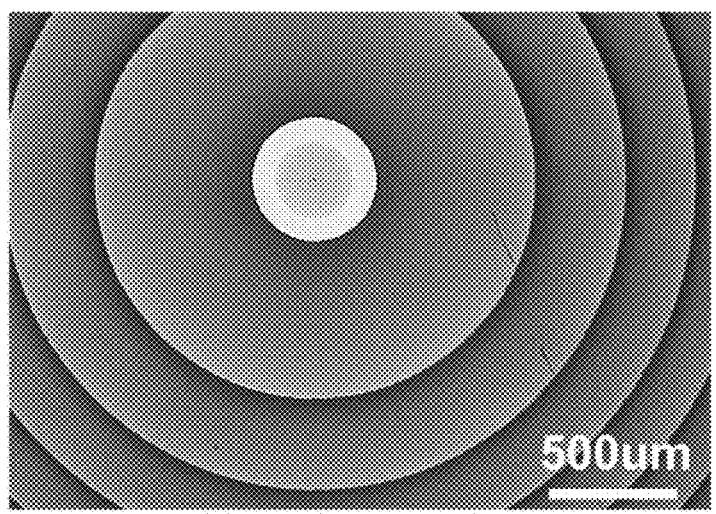
FIG. 8 is a partial top view of a large-area metasurface microstructure array manufactured by a process provided by an embodiment of the present disclosure.
Figure 9:
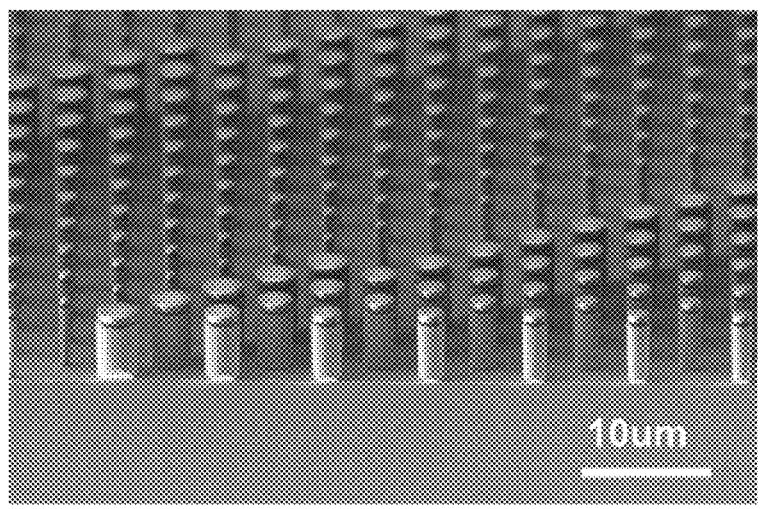
FIG. 9 is a partial oblique view of a large-area metasurface microstructure array manufactured by a process provided by an embodiment of the present disclosure.
Figure 10:
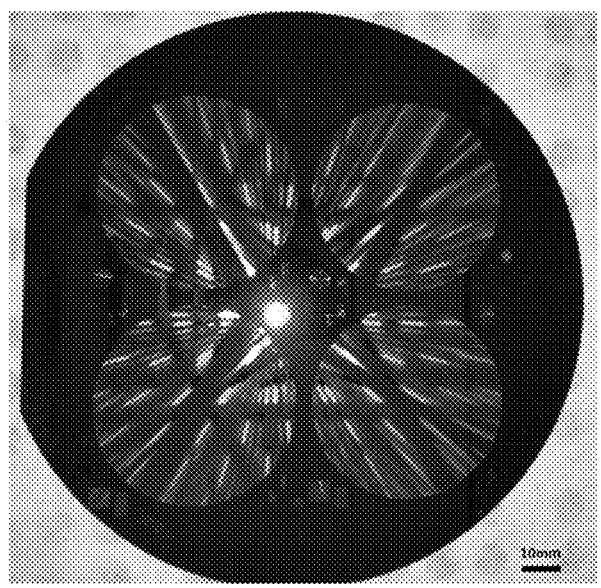
FIG. 10 is a schematic view of four large-aperture metalenses 1 on a 6-inch silicon wafer manufactured by a process provided by an embodiment of the present disclosure.

To further illustrate, the metasurface microstructure array 101 is fabricated by a large-area semiconductor process. In this embodiment, stepping photolithography and ICP etching are the two main processes that are adopted. The stepping photolithography adopts 9 masks and carries out 9 times of stepping photolithography, so that 9 exposure areas are spliced into an exposure area of the large-aperture metalens 1, and the photoresist pattern of the metasurface microstructure array 101 is generated. The ICP etching adopts the Bosch process, and the photoresist pattern generated by stepping photolithography is used as an etching mask to obtain the metasurface microstructure array 101 with a high aspect ratio. FIG. 8 and FIG. 9 are partial top view and oblique view of the metasurface microstructure array 101 respectively manufactured according to the above processes. The microstructure array film coating 102 covering the metasurface microstructure array 101 and the substrate film coating 104 covering the substrate 103 are fabricated by an optical coating process. In this embodiment, electron beam evaporation coating is adopted; the substrate is an intrinsic double-polished wafer, and both sides are polished. FIG. 10 shows four large-aperture metalenses 1 fabricated on a 6-inch silicon wafer, which verifies that the large-aperture metalens 1 of the present disclosure is able to be mass-produced on silicon wafers.

To further illustrate, the infrared focal plane array detector 2 is configured to eliminate stray light and light outside the wavelength band of detection, so as to realize detection and imaging. The infrared focal plane array detector 2 includes a detector window and an infrared focal plane array arranged in sequence along the incident-light direction. The detector window is configured to filter out the stray light of the system and the light outside the wavelength band of detection. The infrared focal plane array is configured to detect and image the converged light. The technical specifications of the infrared focal plane array detector 2 adopted in this embodiment are as follows: the operation wavelength band is 8 to 14 μm; the pixel size is 17 μm; the array resolution is 1280×960.

Figure 11:
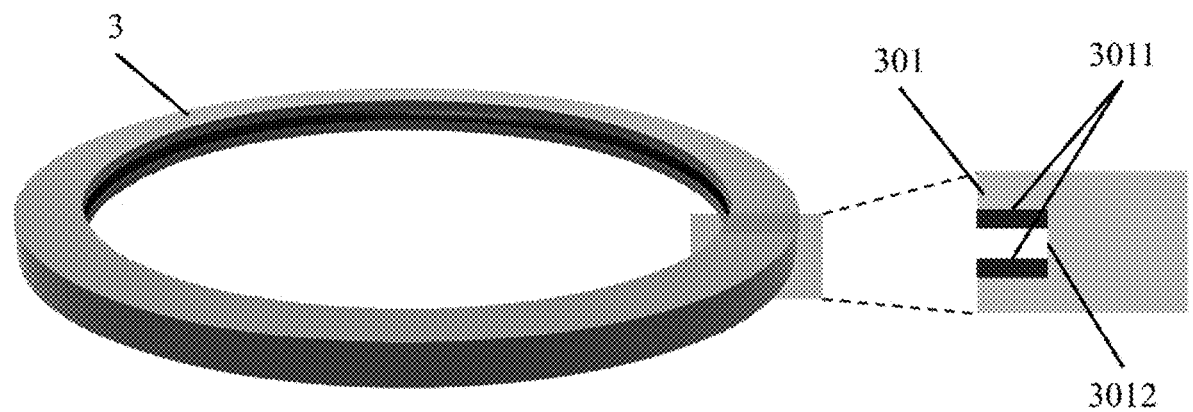
FIG. 11 is a schematic structural view of a metalens mechanical assembly provided by an embodiment of the present disclosure.

To further illustrate, the metalens mechanical assembly 3 is configured to fix, adjust and protect the large-aperture metalens 1 against shocks. As shown in FIG. 11, the metalens mechanical assembly 3 includes a buffer structure 301, and the buffer structure 301 is provided with a mechanical damping member 3011. In this embodiment, the mechanical damping member 3011 is made of rubber; the buffer structure 301 has a groove 3012 matching the edge of the metalens, and the groove 3012 is able to clamp the large-aperture metalens 1 and fix and protect the large-aperture metalens 1 against shocks. As shown in FIG. 1, the metalens mechanical assembly 3 is fixedly connected with the housing 4, and the housing 4 is able to be stretched through the telescopic member 5, so that the metalens mechanical assembly 3 and the housing 4 may cooperate to adjust the metalens.

Figure 12:
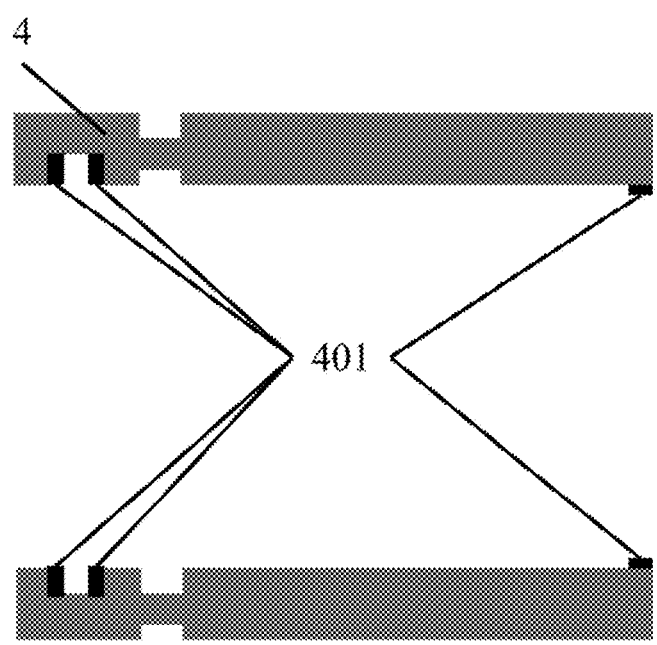
FIG. 12 is a schematic structural view of a housing provided by an embodiment of the present disclosure.

To further illustrate, the housing 4 serves to provide thermal insulation and waterproof protection for the lens. The housing 4 is sealed with a thermal insulation coating 6. In this embodiment, the material of the thermal insulation coating 6 adopts a composite emulsion, and the filler is ultrafine hollow micro-spheres, metal oxide micro-powder and titanium dioxide. As shown in FIG. 12, the sealing process in the embodiment is carried by using sealing gaskets 401 at the joints of the housing 4.

To further illustrate, the distance between the large-aperture metalens 1 and the infrared focal plane array detector 2 is greater than 30 mm. This distance is 50 mm in this embodiment.

Figure 13:
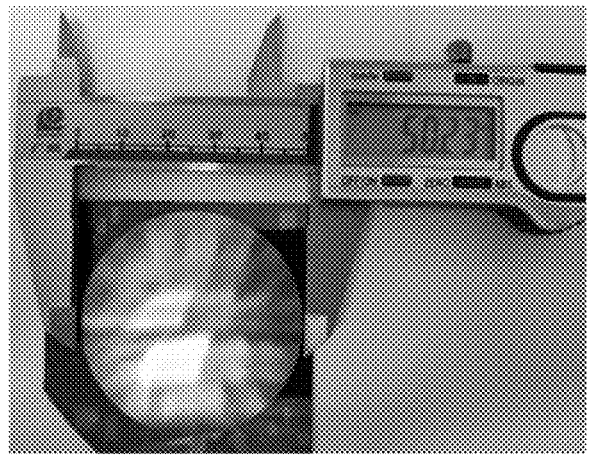
FIG. 13 is a sample photo of the large-aperture metalens provided by an embodiment of the present disclosure.
Figure 14:
FIG. 14 is a schematic view showing the comparison between the indoor 50 m long-range imaging experiment result and the recognition effect of the visible light short-focus lens provided by an embodiment of the present disclosure.
Figure 14:
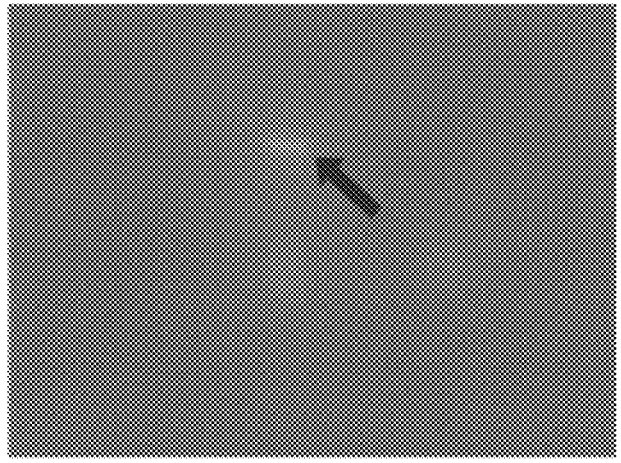

In order to verify the weight and imaging range performance of the large-aperture infrared metalens camera of the present disclosure, the embodiment of the present disclosure is subjected to experimental tests. FIG. 13 is a sample photo of the large-aperture metalens 1 of the present embodiment, which verifies that the metalens aperture of the present disclosure is greater than 50 mm. The weight of the large-aperture metalens of this embodiment measured by an electronic weighing instrument is only 3.7 grams. The results of the indoor 50 m long-range imaging experiment show that the long-range recognition of the target object (indicated by arrow) at 50 m away is feasible, as shown in FIG. 14. Compared with the recognition effect of visible light short-focus lens, the infrared camera composed of metalens has a more obvious recognition effect. According to this result, the embodiment of the present disclosure better balances the goals of "being lighter" and "seeing farther", and solves the conflict between weight and imaging range (or operating range).

It is easy for those skilled in the art to understand that the above descriptions are only preferred embodiments of the present disclosure, and are not intended to limit the present disclosure. Any modifications, equivalent replacements and improvements made within the spirit and principles of the present disclosure should be included within the protection scope of the present disclosure.

What is claimed is:

1. A large-aperture infrared metalens camera, comprising: a large-aperture metalens, an infrared focal plane array detector, a metalens mechanical assembly and a housing;
wherein the large-aperture metalens is disposed on the metalens mechanical assembly, and the metalens mechanical assembly is assembled on the housing, the housing is provided with a telescopic member that is movable axially along a mirror surface of the large-aperture metalens;
the metalens mechanical assembly is configured to fix the large-aperture metalens;
the telescopic member is configured to move the large-aperture metalens axially along the mirror surface thereof, so that a distance between the large-aperture metalens and the infrared focal plane array detector is greater than 30 mm;
the large-aperture metalens is configured to bend a light of thermal radiation of a target object and converge the light onto a surface of the infrared focal plane array detector, and the large-aperture metalens has an aperture greater than 50 mm and a thickness less than 2 mm;
the infrared focal plane array detector is configured to eliminate stray light and light outside a wavelength band of detection, so as to realize detection and imaging.

2. The large-aperture infrared metalens camera according to claim 1, wherein the large-aperture metalens comprises a metasurface microstructure array, a microstructure array film coating, a substrate and a substrate film coating;
the microstructure array film coating is coated on a surface of the metasurface microstructure array, and a surface shape thereof is the same as a shape of the metasurface microstructure array, which is configured to increase transmittance for an incident light;
the substrate film coating is coated on a surface of the substrate so as to increase transmittance for the incident light;
the metasurface microstructure array is located on a rear surface of the substrate, wherein the rear surface of the substrate is a surface where a light arrives later along an incident-light direction.

3. The large-aperture infrared metalens camera according to claim 2, wherein the metasurface microstructure array comprises a plurality of columnar structural units arranged according to an ordered lattice periodicity, wherein heights of the columnar structural units are all the same, and fall within an order of detected wavelength; diameters of the columnar structural units fall within an order of subwavelength;
a periodicity of an array composed of the columnar structural units is less than 10 microns, and a diameter of the array composed of the columnar structural units is equal to the aperture of the large-aperture metalens.

4. The large-aperture infrared metalens camera according to claim 3, wherein a material of the columnar structural units comprises silicon or germanium; a material of the microstructure array film coating comprises zinc sulfide or germanium; a material of the substrate comprises intrinsic double-thrown silicon, zinc sulfide or barium fluoride; and a material of the substrate film coating comprises zinc sulfide or germanium.

5. The large-aperture infrared metalens camera according to claim 4, wherein the aperture and an F-number of the large-aperture metalens are determined according to following formulae:

$$C = \frac{1}{\left(\frac{L}{D \times F} - 1\right) \times P} > C_d$$

$$SNR = K \times \frac{P}{4F^2} > SNR_d$$

wherein C is a pixel density of the target object in a detection image, L is a distance between the target object and the large-aperture infrared metalens camera, D is the aperture of the large-aperture metalens, F is the F-number of the large-aperture metalens, P is a pixel spacing of the infrared focal plane array detector, $C_d$ is a required minimum pixel density of the target object in the detection image; SNR is a signal-to-noise ratio of detection of the large-aperture infrared metalens camera, K is a parameter related to a radiation degree of the target object, detection surroundings, a lens transmittance, and a detector responsivity, and $SNR_d$ is a required minimum signal-to-noise ratio of the large-aperture infrared metalens camera.

6. The large-aperture infrared metalens camera according to claim 5, wherein the metasurface microstructure array is designed by following methods:

optimally designing and obtaining a surface phase distribution of the large-aperture metalens by using a diffraction design algorithm or a ray tracing algorithm according to the aperture and the F-number of the large-aperture metalens;

obtaining a relationship between a phase and a transmittance of the columnar structural units and a size of the columnar structural units;

determining the size of each of the columnar structural units at each position in the metasurface microstructure array according to the surface phase distribution of the large-aperture metalens and the relationship between the phase and the transmittance of the columnar structural units and the size of the columnar structural units, and using the diffraction design algorithm or the ray tracing algorithm again for feedback optimization;

wherein an infrared transmittance of the columnar structural units is greater than a required value of the infrared transmittance.

7. The large-aperture infrared metalens camera according to claim 6, wherein the metasurface microstructure array is manufactured by using a semiconductor technology, comprising but not limited to stepping photolithography, step-scanning photolithography, nanoimprinting, laser direct writing, metal lift-off or ICP etching;

the microstructure array film coating and the substrate film coating are manufactured by an optical coating process, comprising but not limited to electron beam evaporation coating;

the substrate is processed through optical polishing.

8. The large-aperture infrared metalens camera according to claim 1, wherein the infrared focal plane array detector comprises a detector window and an infrared focal plane array, and the detector window and the infrared focal plane array are sequentially arranged along an incident-light direction;

the detector window is configured to filter out the stray light and the light outside the wavelength band of detection;

the infrared focal plane array is configured to detect and image the converged light.

9. The large-aperture infrared metalens camera according to claim 1, wherein the metalens mechanical assembly comprises a buffer structure, the buffer structure is provided with a groove matching an edge of the large-aperture metalens, the groove is provided with a mechanical damping member therein, and the mechanical damping member is configured to fix and protect the large-aperture metalens against shocks;

a material of the mechanical damping member comprises but not limited to a rubber, a composite material or a high damping alloy.

10. The large-aperture infrared metalens camera according to claim 1, wherein contact surfaces where the housing is in contact with the metalens mechanical assembly and the infrared focal plane array detector are respectively provided with sealing gaskets;

the housing is provided with a thermal insulation coating, and a material of the thermal insulation coating comprises but not limited to metal oxide micro-powder or non-metallic hollow micro-spheres.

* * * * *